United States Patent [19]

Lundquist

[11] 3,723,664

[45] Mar. 27, 1973

[54] AUTOMATIC CARD READING PUSH BUTTON TELEPHONE SYSTEM UTILIZING FLUID PRESSURE TECHNIQUES

[76] Inventor: Ingemar H. Lundquist, 11300 Sun Valley Dr., Oakland, Calif.

[22] Filed: July 2, 1971

[21] Appl. No.: 159,359

[52] U.S. Cl...............179/90 CS, 137/81.5, 340/365, 235/61.11 J

[51] Int. Cl...............H04m 1/48

[58] Field of Search.....179/90 K, 90 CS, 90 B, 90 R; 137/81.5; 340/365 R, 365 A; 197/98; 235/201 FS, 145 R, 146 R, 61.11 J; 178/17 R, 17 A, 17 C; 200/46

[56] References Cited

UNITED STATES PATENTS

| | | | |
|---|---|---|---|
| 2,154,316 | 4/1939 | Simek | 235/61.11 J |
| 2,979,255 | 4/1961 | Hubl | 235/61.11 J |
| 3,057,974 | 10/1962 | Cohen | 235/61.11 J |
| 3,588,454 | 6/1971 | Pfeiffer | 235/61.11 J |
| 3,194,893 | 7/1965 | Auel | 179/90 CS |
| 3,593,003 | 7/1971 | Paige | 135/61.11 J |
| 3,634,631 | 1/1972 | Youngs | 179/90 CS |

*Primary Examiner*—Ralph D. Blakeslee
*Assistant Examiner*—Thomas D'Amico
*Attorney*—Robyn Wilcox

[57] ABSTRACT

An ordinary pushbutton type automatic telephone is coupled with an apparatus for automatically and rapidly operating the keys in the desired sequence to fully operate the telephone to complete any desired number, local or long distance. The operating apparatus is controlled by a removable, prepunched paper or card upon which other information may be written; and operation is effected by means of fluidics, preferably under slight pressure.

12 Claims, 8 Drawing Figures

INVENTOR.
Ingemar H. Lundquist
BY
[signature]
ATTORNEY

INVENTOR.
Ingemar H. Lundquist
BY Robyn Wilcox
ATTORNEY

INVENTOR.
Ingemar H. Lundquist
BY Robyn Wilcox
ATTORNEY

AUTOMATIC CARD READING PUSH BUTTON TELEPHONE SYSTEM UTILIZING FLUID PRESSURE TECHNIQUES

BACKGROUND

This invention pertains to an apparatus for operating the keys of a pushbutton type telephone in any desired sequence to fully and automatically actuate the telephone calling mechanism to secure any desired number, local or long distance, and if necessary, to stop such operation at any desired point to await a signal tone.

In the past there have been developed various devices for making a circuit connection between a calling telephone and a called telephone without having to manually dial the called telephone. In the past, most of the successful devices of this type have involved much additional and complex circuitry within the telephone itself, and hence have been too costly to be acceptable to most telephone subscribers. There have also been a number of prior devices relating to operation of a dial type telephone, and these also have been of a rather complex and expensive nature or involve special number recording techniques having a limited repertoire or nonavailability to standard telephones. Other types of devices have attempted to provide expanded repertoires by using hard plastic coated cards for decoding by special complex apparatus, but such cards generally are of considerable thickness and have limited capacity for other information except the party's name and coded telephone number.

SUMMARY

The preferred embodiment of the present invention, which overcomes the problems of the prior art as set forth above and other problems which are inherent in an automatic telephone, is a small, inexpensive device which removably sets upon the standard pushbutton type of automatic telephone, is operated by a small solenoid, and which is controlled by any punched or perforated sheet of paper, or other similar material. The desired result is achieved by providing a small air pump operated by the solenoid; a plurality of air pistons, or diaphragm-operated plungers, which actuate the various buttons of a pushbutton telephone; and a matrix interposed between the pump and the plungers, which matrix is adapted to hold a simple paper-like sheet with a series of punched holes according to the pattern determined by the telephone number of the called party, and means for sequentially selecting the order of the digit plunger to be operated. This apparatus is a simple mechanism for releaseable attachment to the ordinary pushbutton automatic telephone and operates to automatically decode the coder card and automatically operate the digit keys of the telephone in the desired sequence. In the preferred form shown and described herein, the regular telephone circuitry is not modified in any way — the operating plungers engaging the telephone keys, and with no electrical connection to the telephone or its wiring or circuit.

It is, therefore, an object of the present invention to provide an improved automatic actuating system for key-operated devices, and particularly a pushbutton telephone.

Another object of the present invention is to provide an apparatus which may be releasably attached to the conventional pushbutton telephone and which does not require any special wiring of the telephone — as a matter of fact, the casing of the conventional cover of the telephone may not be removed as the user simply places the telephone in the simple and light device of the present invention.

A further object is to provide a "low profile" and relatively small device for automatically operating key-operated machines.

Still another object of the present invention is to provide an automatic telephone calling device for pushbutton telephones which is controlled by a perforated sheet of paper of any desired thickness, or of variable thicknesses, in which the perforations do not have to be cleanly punched holes but may be such as would be secured by pushing the point of a pencil through a piece of paper. It is thus an object of the present invention to provide a device controlled by a perforated sheet but which does not require the use of an expensive paper or card punch.

The organization and method of operation of this invention may best be understood from the following description when read in connection with the accompanying drawings.

DESCRIPTION OF A PREFERRED EMBODIMENT

Figure 1:
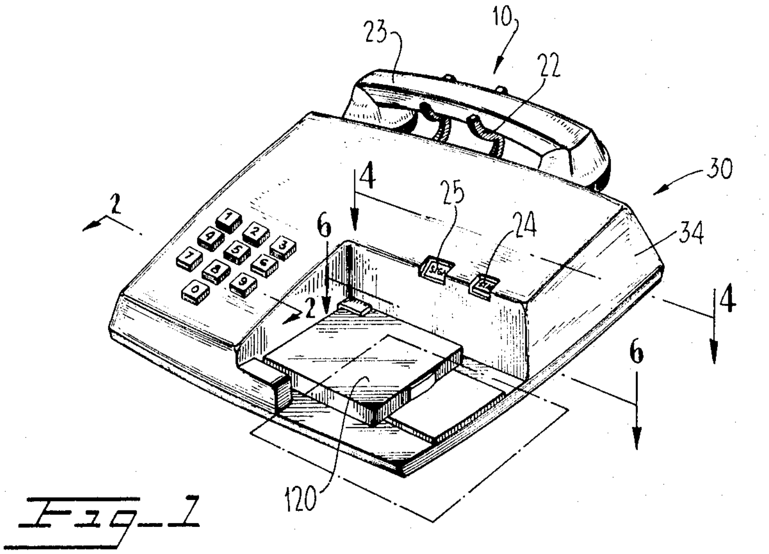
FIG. 1 is a perspective view of the present invention utilizing a standard pushbutton type automatic telephone.

In FIG. 1 there is shown the device of the present invention superimposed over a standard pushbutton type telephone 10. The telephone 10 is provided with ten digital value buttons, such as 17 and 18 (FIG. 2) for the values "1" to "9" and "0," inclusive, each of which, when depressed, gives an electrical signal representative of the digital values "1" to "9" and "0," respectively. The telephone mechanism may be enclosed within a casing 21 which is provided by the telephone company and which need not be opened when the telephone is used with the mechanism of the present invention. It should be understood at the outset that the present automatic signal operating device of the present invention does not connect to the circuitry enclosed within the telephone casing in any respect — it merely automatically operates the various digital value buttons, such as 17 and 18, in a selected order to provide automatic and rapid calling of a telephone number. The telephone 10 is, as is conventional in this art, provided with a cradle 22 and a handpiece 23, the latter including both the speaking and listening elements of the telephone. Since the present invention requires no changes in the automatic telephone with which it is associated, and since the pushbutton type automatic telephone has been well described in prior patents, it is believed unneccessary to further describe the telephone with which the present invention is associated.

Figures 2, 3:
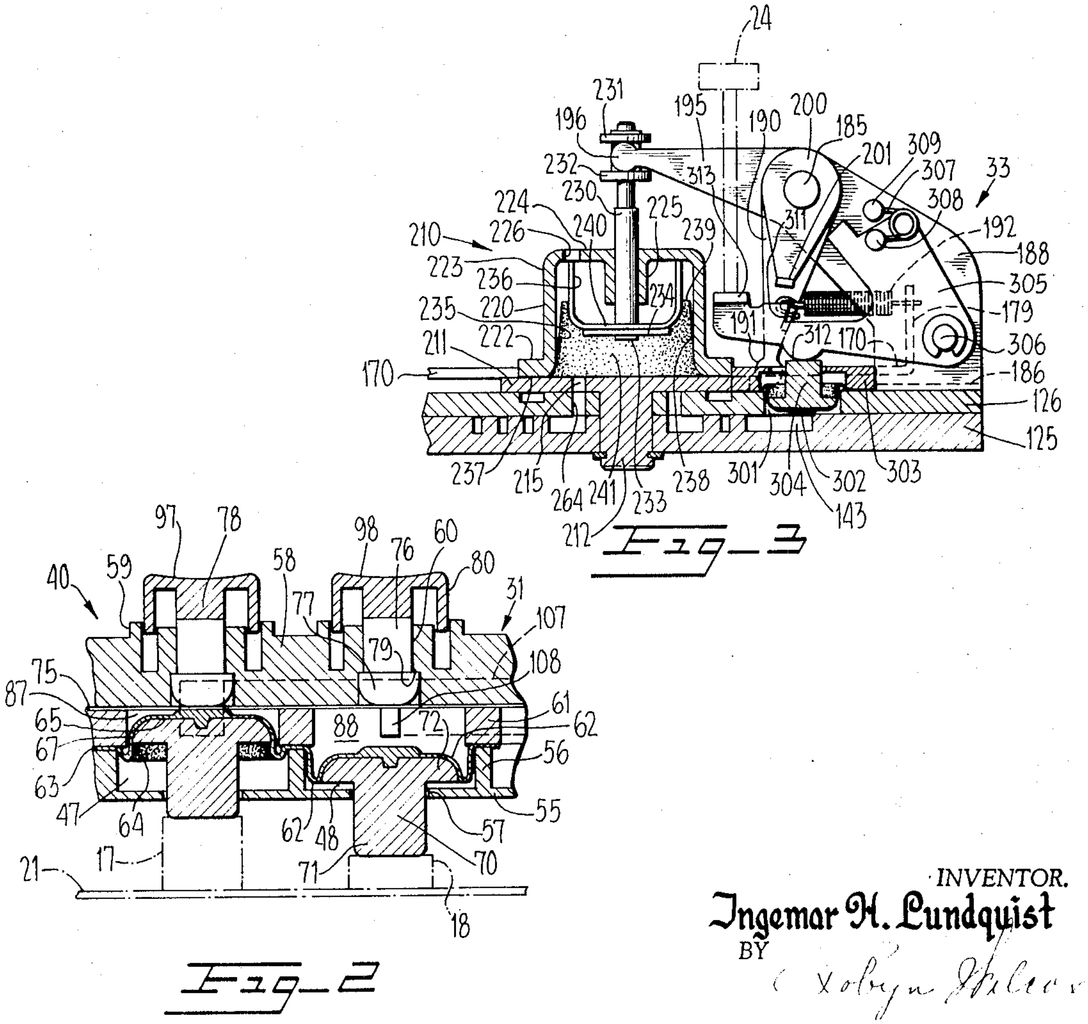
FIG. 2 is a partial vertical cross-sectional view, on an enlarged scale, of the pushbutton operating devices taken along the plane indicated by the lines 2—2 of FIG. 1.
FIG. 3 is a vertical cross-sectional view of the pump which supplies air under slight pressure to operate the plungers illustrated in FIG. 2, such as taken along the plane indicated by the line 3—3 of FIG. 4.
Figure 4:
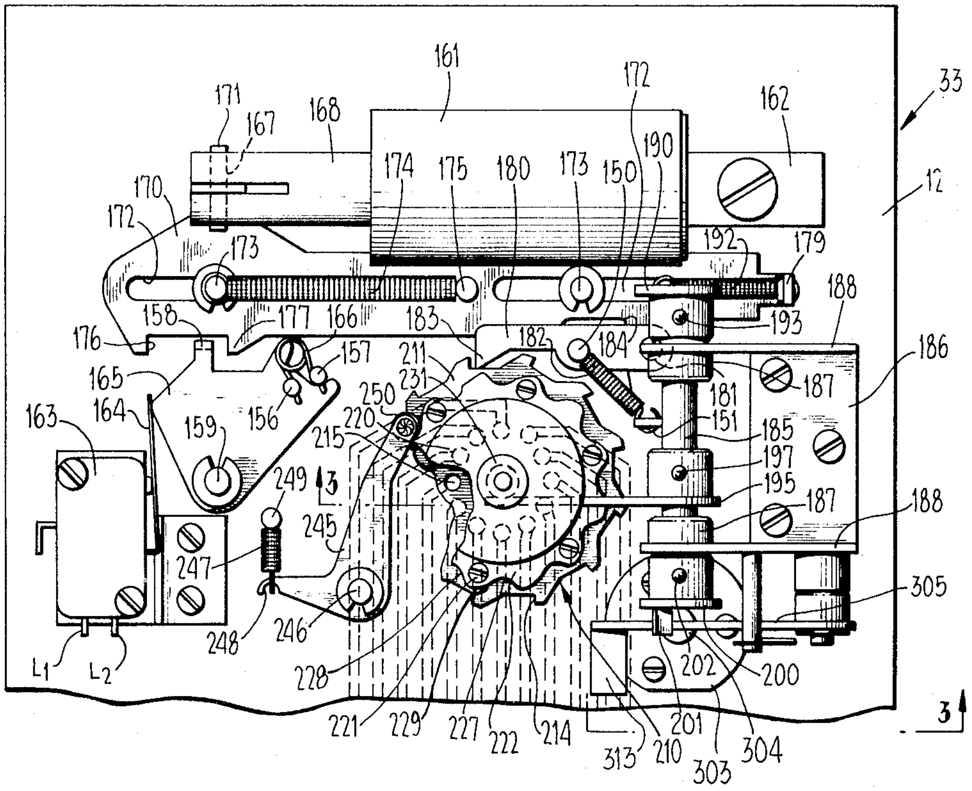
FIG. 4 is a plan view of the pumping section of the present invention, such as taken along the plane indicated by the line 4—4 of FIG. 1.

The automatic pushbutton operating device 30 of the present invention might be said to comprise three operating sections: (1) a pushbutton matrix, or operating section, 31 (shown in detail in FIGS. 2 and 7); (2) a switching matrix section 32 (shown in detail in FIGS. 5, 6 and 7); and (3) a power section 33 (which is shown in FIGS. 3 and 4 and described in Section C associated with those figures). The three sections are enclosed in a suitable casing 34 which embraces the telephone 10 by any suitable means (not shown). It will be understood that preferably the telephone and the automatic signaling device 30 may be readily separated from each other, but that when the automatic signaling device 30 is associated with a telephone, the telephone will be latched thereto by some suitable means, not shown, but which will depend on the manner of placing the two devices together. It is obvious that the telephone must not slip or be accidentally displaced from the operating position within the present automatic device as the pushbutton operating devices must always be located over the button they are supposed to operate.

A. BUTTON OPERATING MECHANISM

Figures 6, 7, 8:
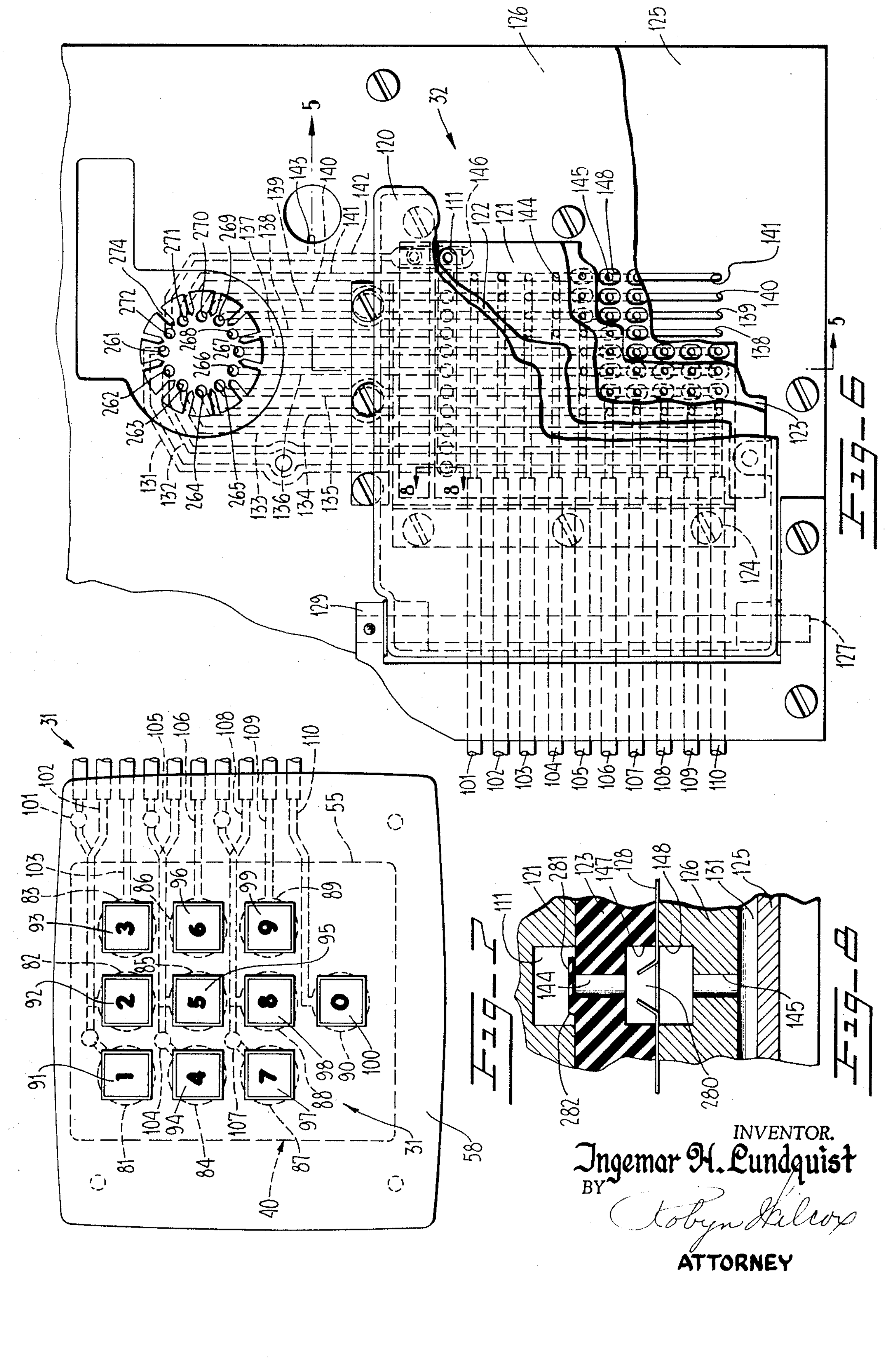
FIG. 6 is a plan view with parts broken away to show the arrangement of the various levels of the switching matrix portion of the present invention, such as taken along the planes indicated by the lines 6—6 of FIG. 1.
FIG. 7 is a plan view of the keyboard section of the device shown in FIG. 1, showing particularly the manually operable keys by which an operator may call a number and thus bypass the automatic mechanism of the present device, and the arrangement of air channels leading to the operating plungers.
FIG. 8 is an enlarged cross-sectional view of a suitable one-way valve for use in connection with the "stop" mechanism.

The automatic pushbutton operating mechanism 40 is shown in FIGS. 2 and 7, and is located in the operating section 31. It includes 10 plunger chambers, such as 47 and 48, which are adapted to overlie the respective telephone keys, such as 17 and 18, and to operate them in the proper order to automatically call a desired telephone number which has been precoded in a punch card, or paper, or other media. In FIG. 2 the telephone key 17 is shown in its raised and inoperative position, while key 18 is shown as depressed, and, therefore, its operated position. The chambers, such as 47 and 48, are therefore spaced in the same arrangement and have the same center-to-center dimensions as the pushbuttons, such as 17 and 18, of the telephone 10. The operating matrix 40 comprises a base member 55 which can be constructed of any suitable material, such as molded plastic. A series of vertical walls 56, integral with the base plate 55, form the respective chambers, such as 47 and 48. In the center of each chamber, such as 47 and 48, is an aperture 57, adapted to loosely encompass an operating plunger 70 to be described shortly. The matrix 40 also includes a top member 58 adapted to be rigidly secured to the base member 55 by any suitable means, not shown. The top member 58 is provided with a series of apertures 60 axially aligned with the plunger apertures 57 of the base plate 55, and hence axially aligned with the telephone keys, such as 17 and 18. On the upper face of the top member 58 surrounding each aperture 67 is a key guide 59 which is adapted to loosely enclose a manually operable key top 91 to 100, inclusive (FIG. 7) to be described shortly.

The matrix 40 also includes an intermediate grid member 61 formed of an air impervious resilient material, such as rubber. This insert grid member 61 has the same contour as the vertical walls 56 of the base member 40. This insert member 61 is so dimensioned that when inserted over a lower diaphragm 62 and an upper diaphragm 75 is laid over it, the combination of the grid and the two diaphragms will form a series of air pressure chambers, such as 87 and 88, which overlie the plunger chambers 47 and 48, respectively, and thus overlie the respective telephone operating buttons 17 and 18, respectively. When clamped between the base member 55 and the top member 58, the insert 61 will be slightly deformed so as to form a perfectly air-tight seal with the two diaphragms just mentioned.

The diaphragm 62 which is clamped between the vertical walls 56 of the base member 55 and the lower face of the insert 61 preferably is preformed, as shown. This diaphragm has flat sections 63 which lie upon the vertical walls 56. Preferably, the diaphragm 62 also includes, immediately adjacent the flat sections 63, a U-shaped curve 64 and a substantially flat center section 65, the last two sections being separated by a relatively short vertical wall section 67. This shape of a diaphragm is shown particularly in FIG. 2, and is adapted to provide a vertical movement of the central section 65 of the diaphragm without tensioning the diaphragm itself. Thus, a slight air pressure is sufficient to move the diaphragm from the inoperative position shown on the left of FIG. 2 to a fully extended position on the right side of the same figure, in which the diaphragm will be forced downwardly toward the top face of the base member 55.

Associated with the respective lower chambers, such as 47 and 48, is a series of plungers 70, one in each of the lower chambers (such as 47 and 48). These plungers have a stem portion 71 which is adapted to rest upon the top of the respective telephone keys, such as 17 and 18, and is loosely held in position by the respective aperture 57. The plunger also includes an enlarged head 72 which lies against the face of the diaphragm 62, and is preferably held in a center position by means of an integral projection on the diaphragm engaging a complimentary indentation in the plunger, as shown. Normally, the plunger 70 is held in its uppermost position by the spring (not shown) within the telephone which holds the respective telephone keys, such as 17 and 18, in their upper and inoperative position. However, when a slight amount of air is introduced into any of the air chambers, such as 87 and 88, it is sufficient to overcome the force of the related telephone spring (not shown) to depress the plunger 70 associated with that chamber, and hence depress the corresponding telephone key.

The second diaphragm 75, which may be a flat sheet of resilient material, such as rubber, is clamped between the top member 58 of the operating matrix and the insert 61. A series of manually operable keys 91 to 100, inclusive (FIG. 7), corresponding to the telephone keys, such as 17 and 18, respectively, are arranged in respective apertures 60 of the top member 58. Preferably, as shown in FIG. 2, these manually operable keys are formed of two sections: a stem portion 76, with a head 77 on the bottom end thereof, which head is adapted to abut against a shoulder formed adjacent each aperture 60 and an upper key top 78, preferably formed with depending shoulders 80 adapted to engage the key guides 59 on the top plate 58. The upper diaphragm 75 is designed to hold the lower head 77 against the shoulder 79, and thus hold the manually operable keys, such as 97 and 98, in the upper inoperative position shown.

When the device of the present invention is in the normal inoperative position, the operating plungers 70 lying in the various chambers, such as 47 and 48, are individually held in the upper position shown on the left in FIG. 2 by the springs associated with the telephone digit keys, such as 17 and 18, respectively. In this position the lower diaphragm 62 normally abuts the upper diaphragm 75 and the upper diaphragm will hold the associated manual key stems 76 in the elevated position shown in FIG. 2. If the operator desires to manually call a number on the telephone, he may do so by depressing the manual keys 91 to 100, respectively, shown in FIG. 7 or in detail as shown for keys 97 and 98 in FIG. 2. These keys, in turn, depress the corresponding operating plunger 70 and the corresponding telephone key, such as 17 or 18. Thus, the operator, when he desires to do so, may manually call any telephone number.

The device may be operated automatically from a punch card, to be described hereinafter, which permits the injection of a small amount of air into the proper air pressure chamber, such as 87 or 88. When air is introduced into any one of these chambers, it forces the lower diaphragm 62 in that chamber downwardly, thereby depressing the operating plunger 70 and depressing the corresponding telephone key, such as 17 or 18. The air can be introduced into the air pressure chambers 81 to 90, inclusive (FIG. 7), through a series of air channels 101 to 110, inclusive, also shown in FIG. 7. It will be noted that the channels 103, 106 and 109 may lead directly into their respective air pressure chambers and hence operate the telephone keys for the values "3," "6" and "9," respectively. The air ducts 101, 104 and 107 leading to air pressure chambers associated with the telephone keys for the numbers "1," "4," and "7" can lead through the upper plate, or top member, 58 to the respective chambers. The ducts leading to the pressure chambers for the key for numbers "2," "5," "8" and "0" can be formed in the insert plate 61 as channels 102, 105, 108 and 110, respectively. For a portion of their distance, channels 101, 104 and 108 are superimposed over channels 102, 105 and 108, as shown in FIG. 7. This superimposing of one channel over another is necessitated by the fact that the telephone key buttons are so close together that there is not sufficient room to put these channels side-by-side.

As the air channels 101 to 110, inclusive, pass from the operating matrix 40 in operating section to the switching matrix section 32, they are equally spaced one from another and pass directly into the upper section of the switching matrix, as will now be described.

B. SWITCHING MATRIX

Figure 5:
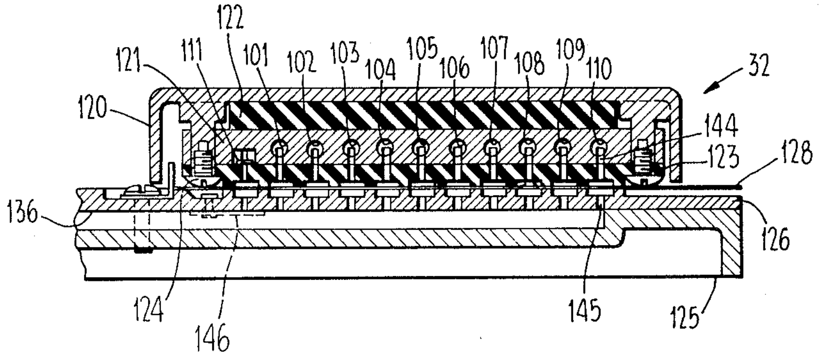
FIG. 5 is a vertical cross-sectional view of the switching matrix taken along the plane indicated by the line 5—5 of FIG. 6.

The switching mechanism, or matrix, 32 is best shown in FIGS. 5 and 6. As shown in those figures, the air channels 101 to 110, inclusive, lead as directly as possible into an upper matrix block, or plate, 121. Obviously, the air channels 101 to 110 are as straight and short as possible in order to facilitate manufacturing and in order to provide passages in which a small flow of air will not be trapped or caused to eddy. The matrix plate 121 is rigidly secured in a cover plate 120, preferably being cushioned by a resilient rubber cushion 122 which lies between the matrix plate 121 and the cover plate 120. Preferably, a resilient rubber cushion plate 123 is rigidly mounted on the lower side of the switching plate 121, such as by cementing. It can be noted at this point that the punched card 128 which controls the operation of the signaling mechanism is clamped between this lower cushion 123 and a lower matrix plate 126, rigidly mounted on a base plate 125 of the device. The upper matrix plate, the two cushions and the cover plate are held in rigid relationship by any suitable means, such as machine bolts 124 threaded through apertures in the cushions and matrix plate and into suitable bosses on the cover plate. It should perhaps be noted here that the cover plate 120 is hinged, as by bar 127, journalled in bearings 129; and that the two ends of the passageways 101 to 110, inclusive, are connected by flexible hose connectors, not identified. The upper matrix plate 121 is held firmly against lower plate 126 by any suitable means, not shown, such as a latch, a toggle latch, or even by making the top plate relatively heavy.

Since the mechanism of the present invention operates with small amounts of air under slight pressure, as will be described more in detail in Section C. hereafter, air leakage could be an important problem with the operation of the device. Air leakage is prevented by placing the prepunched card or sheet of paper 128 upon the lower matrix plate 126, and clamping it in that position by the upper matrix plate assembly. When so clamped, the resilient cushion not only forces the punched card 128 tightly against the lower matrix plate 126, but also forms an air-tight seal with the upper matrix plate.

A preferred form of the present invention is designed to accommodate twelve digits of a called number. Local calls normally require only seven digits, but long distance calls require 10. In addition, some telephones connected to an intermediate station require the digit dialing of a particular value, usually "9," in order to go through the local board to an outside wire. Thus, the base plate 125 is formed with eleven supply channels 131 to 141, inclusive, and a "stop" channel 142, the use of which will be described in the next paragraph. It can be noted here that "stop" channel 142 extends only to a "stop" channel 111, in the upper matrix plate 121, and will have no connection with air channels 101 to 110, inclusive. These supply channels 131 to 142, inclusive, lie parallel to each other in the base plate 125 and run at right angles to the air channels 101 to 110, inclusive, in the upper plate 121, as shown in FIG. 6.

Needless to say, the supply channels 131 to 141, inclusive, and the air channels 101 to 110, inclusive, are equally spaced with respect to the other channels of the respective group in order to utilize a punch card 128 which will have its numbers, or operative spots, arranged in equally spaced rows and equally spaced orders, although the distance between the channels of each row need not be the same as the distance between the channels of each order. It will be understood that usually a punch card, or other perforated media, have equal spacing between numbers, and equal spacing between orders, although the inter-ordinal spacing need not be the same as the spacing between orders. For the moment it should be noted that air under pressure is supplied to the air supply channels 131 to 142, inclusive, in sequence by means of a mechanism to be described in Section C hereafter.

In addition to the air channels 101 to 110, in the upper matrix plate 121, this plate is provided with an additional channel 111 (FIG. 6) which is utilized to stop operation of the device. For example, when going through a company exchange to an outside wire, it is often necessary to dial a preselected number, usually "9," and wait for a dial tone before proceeding with the dialing of the called number. Likewise, when making a long distance call in certain systems it may be necessary to wait for a dial tone before digiting the seven-digit local number. The stop channel 111 is provided to automatically stop the call at preselected places in the called number. Preferably, this will be done by punching a hole in the twelfth column of the punch card 128 in addition to the digit of the called number, and the stop channel 111 is utilized to stop the machine with the dialing of that number.

From what has been said, it is believed that from the above description it is obvious that the upper matrix plate 121 is provided with the air channels 101 to 110, inclusive, and a "stop" channel 111 which run parallel to each other and are equidistantly spaced from each other, and the base plate 125 is provided with a plurality of supply channels 131 to 142, inclusive, which, incidentally, run in the base plate in a direction perpendicular to the supply channels 101 to 110 and the stop channel 111. These channels are supplied with air under pressure in sequence by the power-operated mechanism to be described in Section C.

Whereever the supply channels 131 to 142, inclusive, and the operating air channels 101 to 110 and stop channel 111 would interconnect if they were in the same plane, passageways are provided in the respective matrix plate leading directly toward the other set of channels. Thus, the upper matrix plate 121 and the lower rubber cushion 123 are provided with passageways 144 extending downwardly to connect to aligned passageways 145 extending upwardly in the lower matrix plate 126. The passageways 144 and 145 are enlarged, as shown at 147 and 148, respectively (see FIG. 8), so that if the holes in the punched card 128 are not clearly cut, such a condition will not interface with the flow of air therethrough. It should be understood that each of the operating channels 101 to 110, inclusive, and stop channel 111 have the passageways 144 adapted to connect to the passageways 145 of each of the supply channels 131 to 141, inclusive, and that stop channel 111 has an additional channel 144 connecting to a channel 145 in supply channel 142. It should be noted at this point that the supply channel 142 has no other connection, so that it does not connect to the operating channels 101 to 110 in the preferred embodiment of the invention.

Each of the air channels 144 leading into the "stop" channel 111 is provided with a one-way valve 281 (FIG. 8) which is adapted to prevent back flow from channel 111 into any of the channels 144. This feature is desirable in view of the fact that someone may desire to stop operation of the device more than once — it is not necessary if it could be assumed that the stop mechanism would not be used more than once during the programmed sequence. If there is a hole in the eleventh position of the punched paper, air can flow from the supply channel (such as channel 131 in FIG. 8), through channel 145, the hole 280 in card 128, channel 144, one-way valve 281, and into channel 111. Obviously, if there were no one-way valves in channel 111, the air from the operative supply channel would be free to pass into all of the air conduits 101 to 110, inclusive, wherever there is a hole punched in the card for that channel, as all of those channels communicate with channel 111. Such a dispersal of air throughout the system would probably prevent there being enough air to operate the stopping mechanism described in Section D or, if there were enough air to operate the stop mechanism there would also be enough to operate some one of the telephone digit keys or perhaps cause a jam by trying to operate two or more of them. Hence, it is quite necessary to provide the one-way valves between all of the channels 144 leading into stop channel 111. A simple one-way valve can be provided by molding a cap 281 over the upper end of each of the channels 144 leading into the stop channel when molding the cushion 123. The molded cap 281 is then almost severed from the body of cushion 23, thereby providing a cap 281, hinged at 282, on the top side of cushion 123 over the channels 144 leading into stop channel 111. Thus, air can flow upwardly from any of the channels 144 into stop channel 111, lifting the cap 281 away from the cushion 123; but any reverse flow immediately pushes the cap against the cushion.

It can be noted that the passageways 144 or 145, to connect the stop channel 111 to the supply channel 142, is also provided with a one-way valve 146 (see FIG. 6) which permits passage of air from the stop channel 111 into channel 142 but not from supply channel 142 into stop channel 111. A simple one-way valve, as was shown in FIG. 8 and which was described in the preceding paragraph, can be used. Such a valve can be formed by molding a cap on the underside of lower matrix plate 126 at the point where it would underlie the channels 144–145 interconnecting operating channel 111 with supply channel 142, and then severing it partially away from the matrix plate. It can be noted here that the stop channel 142 also connects to a stop mechanism channel 143 which is used to stop operation of the device. Since channel 142 is the last of the supply channels, normally it is used only to stop the mechanism, so there is no need for it to supply air to the operating channels 101 to 110. On the other hand, the stop mechanism may be operated at selected times during the automatic operation of the device and this is accomplished by permitting air to pass through channel 111 through the one-way valve 146, supply channel 142 and thence into the stop mechanism channel 143.

It is believed obvious from the disclosure above that all of the supply channels 131 to 141, inclusive, communicate with all of the operating channels 101 to 110, inclusive, through the passageways 145 and 144 unless an impervious member is inserted between the lower matrix plate 126 and the rubber cushion 123. Such an impervious member is desirably a prepunched card which will have only one digital value punched in each order of the card, although it should be noted that the card may also be punched with a "stop" hole in order to operate both a telephone button for a number of "1" to "9" or "0," and the stop mechanism in that sequence. However, the telephone will not operate if two buttons are punched simultaneously, so only one hole should be punched in each order (other than the stop code) in order that only one telephone button will be operated for each order of the punch card. Wherever a card 128 is punched, air from the operative supply channel 131 to 141, inclusive, goes through passageway 145 into 144 and consequently into the proper operating channel 101 to 110, and thence into an air pressure chamber, such as 87 or 88, to depress the plunger 70 in the corresponding operating chamber, such as 17 or 18, and thus operate the proper button of the telephone 10. However, if there is no hole punched in the card, then the card forms an air-tight seal and prevents flow of air from orifice 145 to passageway 147.

The means for supplying air to the supply channels 131 to 142 in proper sequence will now be described.

C. SUPPLY MECHANISM

The means for sequentially supplying air to the respective orders of the switching section 32, or what might be called the power mechanism 33, is shown in FIGS. 3 and 4. This mechanism is operated by a solenoid 161 which is mounted on a suitable base plate 162 affixed to the base plates 125 and 126. Power to operate the solenoid 161 is controlled by a Micro-Switch 163 which is connected to a suitable source of electric power by leads $L_1$ and $L_2$. The operation of the Micro-Switch 163 is controlled by an operating arm 164 which may be actuated by a rocker 165 that is pivotally mounted on the base plate 125 by any suitable means, such as pivot pin 159. The rocker 165 is provided with an ear 158 which is adapted to be engaged by shoulders 176 or 177 on a power-operating slide 170, to be described shortly. A toggle spring 166, one end of which engages a stud 157 on the base plate and the other end of which engages a stud 156 on the rocker 165, holds the rocker in either a fully operated, or switch-closing position, or in an inoperative one, unless the rocker 165 is being moved in one direction or the other by the respective ears 176 and 177 on the power slide 170. When the rocker 165 is moved to its operative position (the counter-clockwise position shown in FIG. 4), it rocks the Micro-Switch arm 164 (counter-clockwise in this figure), thereby closing the normally open switch 163. This supplies power to the solenoid 161 which is operative to retract its armature 168. The retraction of the armature 168 is operative to move a power slide 170 (to the right in FIG. 5) by means of a pin which penetrates the solenoid armature and an ear 171 projecting laterally from the slide to engage a complimentary slot 167 in the solenoid armature. The power slide 170 is mounted on the base plate by any suitable means, such as the pin-and-slot connections, comprising the slots 170 and studs 173 carried by the base plate 125–126. The slide preferably is biased to the fully extended position by a suitable tension spring 174 tensioned between one of the studs 173 and a stud 175 rigidly secured to the power slide 170. The power slide is provided with a pair of opposed shoulders 176 and 177, each of which is adapted to engage the ear 158 on the switch-operating rocker 165.

Whenever the solenoid 161 is retracted to move the power slide 170 (to the right in FIG. 4), the shoulder 176 engages the ear 158 to rock the switch-operating rocker 165 (clockwise in this figure) to move it away from the switch-operating arm 164. This breaks the circuit in the Micro-Switch 163 to terminate the power to the solenoid 161. When the power to the solenoid 161 is interrupted, a spring (not shown) but which is conventional in solenoids, together with the spring 174, pulls the armature of the solenoid and the power slide 170 to the fully extended position shown in this figure. Thereupon the shoulder 177 engages the ear 167, turning the rocker 165 (counter-clockwise in this figure) to engage the switch-operating arm 164 and again close the switch 163. Thus, the solenoid is operated in the series of separated strokes in which the switch 163 is first closed to operate the solenoid, the operation of the solenoid breaking the switch and terminating power to itself, and the return of the armature to its normal position being effective to again close the switch. It can be mentioned at this point that there is an intermediate position of the slide 170 which is operated by the stop mechanism which will be described hereafter. When the stop mechanism is operated, the power slide 170 is latched in an intermediate position in which it cannot operate the switch control rocker 165 to close the switch 163, thereby holding the power slide 170 and all of the mechanism controlled thereby in an intermediate and inactive position. The toggle spring 166 is effective to bias the switch control rocker 165 to either the closed or open position until one or the other of the shoulders 176 or 177 engages the ear 167 to move the rocker 165 to the other position.

A power shaft 185 (see also FIG. 3) is journalled in suitable bearings (not shown) provided in parallel, upwardly extending arms 188 of a bracket 186 rigidly secured to the base plates 125 and 126 by any suitable means, not shown. The power shaft is held against axial displacement by a pair of collars 187 rigidly affixed thereto by any suitable means, such as pins, not shown. The power shaft carries three arms: an operating arm 190, a pump-operating arm 195 and a stop arm 200. Each of these arms is rigidly secured to the shaft by suitable means, such as pins 193, 197 and 202, respectively, extending through the hub of the arms and into the operating shaft 185.

The operating arm 190 has a rounded nose 191 which is engaged in a slot 172 in the power slide 170. In one embodiment of the device of the present invention, the slot 178 was only slightly larger than the nose 191, whereby movement of the power slide directly and positively effected a corresponding rocking of the power shaft 185. However, since it is necessary to provide a yield in the pump-operating arm, it has been found that it is preferable to elongate one of the slots 172 to enclose the nose 191 of arm 190. Thus, the movement of the power slide 170 to its fully extended position (to the left in FIG. 4) will positively rock the arm and consequently the power shaft 185 (clockwise in FIG. 3). In this preferred embodiment, the retraction of the power slide 170 causes the arm to rock to an operative position (counter-clockwise in FIG. 3) by means of a spring 192 tensioned between an upturned ear 179 on the extreme right-hand end of the power slide 170 and a suitable seat, not shown, in the power arm itself.

The pump arm 195, likewise pinned to the shaft 185, is provided with a round nose 196 which is embraced between collars, or flanges, 231 and 232 on an operating stem 230 of a pump 210, to be described in the next paragraph. The stop arm 200, likewise pinned to the power shaft 185, is provided with a perpendicular ear 201 which is adapted to be engaged in an intermediate position by a shoulder 311 on a bellcrank 305 operated by the stopping mechanism, to be described in Section D hereafter. The relative angular positions of the three arms 190, 195 and 200 is shown in FIG. 3.

The pump 210 is mounted on a base plate 211 that is pivotally mounted on the base plate 125 by a stud 212. The outer, or peripheral edge, of the rotatable base plate 211 is provided with ratchet teeth 214 (FIG. 4) spaced at 30° angles around the periphery of the base 211. These ratchet teeth are adapted to be engaged by a ratchet 180 (FIG. 4) pivotally mounted, as by means of a pivot stud 181, on a laterally extending portion 184 of the power slide 170. A tension spring 182, tensioned between a stud 150 on the ratchet 180 and an ear 151 on the extension 184 of power slide 170, biases the nose 183 of the ratchet 180 into engagement with the periphery of the rotating pump base 211. With each stroke of the power slide 170, the ratchet 180 is actuated, thus rotating the base 1/12th of a circle. This mechanism thus provides for rotating the pump 210 through an angle of 30° with each cycle of operation of the solenoid 161. The rotating base 211 of the pump is provided with a single outlet 215.

A pump cover, or casing, 220 is rigidly mounted on the base plate 211 by any suitable means, such as screws 221, extending through a peripheral flange 222 of the cover and threaded into the base plate 211. The cover is generally cylindrical in shape, having cylindrical walls 223 and a top plate 224, the latter of which is provided with a stem guide 225 to guide the stem 230 of the pump, and an air vent 226 so that the operation of the pump diaphragm will not effect any compression in the pump cover.

A pump stem 230 is slidingly set in the stem guide 225 for free but guided vertical movement therein. The pump stem 230 is provided with a pair of collars 231 and 232 which embrace the nose 196 of the pump arm, as previously described. The lower end of the pump stem 230 is threaded to receive a screw 233, which, by means of a washer 234, affixes a pump diaphragm 235 to the stem 230. The pump diaphragm is molded in the shape shown in FIG. 3 and comprises a flat peripheral section 237, a cylindrical section 238, a U-shaped curve 239 leading to a central flat section 240 which is tightly clamped between the washer 234 and a cylindrical washer 236. The diaphragm is so shaped as to readily form a rolling curve as the pump stem is operated, the diaphragm being guided between the cylindrical wall of the cylindrical washer 236 previously mentioned as being attached to the stem 230 and the wall of casing 220. The cylindrical washer 236 also affords a pump stop as well as guiding the diaphragm in the reciprocating movement of the stem 230.

The cover plate 220 is provided with twelve equiangularly spaced centralizer detent depressions 227 (FIG. 4). A centralizer 245, in the form of a rocker, is pivotally mounted on the base plate 125 by any suitable means, such as pivot stud 246. The centralizer is biased into engagement with the periphery of the cover by a suitable tension spring 247 tensioned between a nose 248 on the rocker and a stud 249 carried by the base plate. The other arm of the rocker 245 carries a roller 250 adapted to engage the detent depressions 227 of the pump cover 220, thus holding the pump firmly in one of the twelve operating positions. As shown in FIG. 4, the respective depressions 227 are separated by a sharp decline 228 leading away from a depression and an easy rise 229 into the next one. By means of this centralizer, the pump is rotated to one of its twelve fully operated positions, avoiding rocking beyond a predetermined registration point or failing to reach it.

The lower matrix plate 126 is provided with twelve orifices 261 to 272, inclusive (FIG. 6), equiangularly spaced around the base plate 125 and radially so positioned as to register with pump outlet 215 in the 12 successive positions of the pump 210, which orifices connect with the supply channels 131 to 142, respectively, formed in the base plate 125. A series of radial slots 274 are positioned between the successive supply channel inlets 261 to 272, and their inner ends also register with pump outlet 215 as it passes from one channel inlet to the successive one. This construction provides an inlet into the pump chamber 241 as the pump stem 230 is being raised and the pump rotated to the next position. Thus, as the pump member is rotated step-by-step with each stroke of the power slide 170, the pump outlet 215 will register successively with the inlets 261 to 272, inclusive, and thus afford air supply successively to the supply channels 131 to 142 in the proper sequence, and also open the pump chamber 241 to atmosphere during the suction stroke of the pump 210. Obviously the pump chamber 241 is closed to atmosphere during the pumping stroke of the pump as then the pump outlet registers with one of the orifices 261 to 272, inclusive.

In the preferred embodiment of the present invention, the pump chamber 241 is of a size sufficient to afford a supply of air sufficient to both operate one operating plunger 70 to effect a digital registration of the telephone keys, and enough air to operate the stop mechanism if that is called for. Since, in most cases, only an amount of air sufficient to operate the telephone key will be required, it is desirable to have the yield between the operating shaft 185 and the pump actuating arm 195, which is afforded by the pin-and-slot and cooperating spring described in connection with the operating arm 190.

It is believed that the operation of the pumping mechanism will be obvious from the previous description. It can be noted in passing that the pump 210 is operated with each stroke of the solenoid 161 and on the return of the solenoid and power slide 170 to the extended position, the pump is rotated an increment of 30° to register the pump outlet 215 with successive ones of the supply orifices 261 to 272, inclusive. This provides a supply of air to the air conduits, or supply channels, 131 to 142, inclusive, in succession, as required by this device.

D. STOP MECHANISM

The stop mechanism, best shown in FIG. 3, is operated by air pressure in stop channel 142 which interconnects inlet 272 with stop channel 142 (FIG. 6) and thence to branch channel 143, already mentioned. Thus, the stop mechanism is operated either by the sensing of a stop hole in the punch card 128 registering with stop channel 111, or by the pump 210 being rotated to the twelfth, or final, position. This mechanism comprises a chamber 301 (FIG. 3) formed in the lower matrix plate 126. The branch stop channel 143 leads into the lower part of this chamber 301. A flexible diaphragm 302, preferably shaped as shown in FIG. 3, seals the chamber 301, being clamped to the base plate by a suitable collar 303. Preferably, a diaphragm plunger 304 is attached to the diaphragm 302 by any suitable means, not shown. Thus, the connection of channel 143 to either channel 142 or channel 111 is effective to raise the diaphragm and operate the plunger 304. The plunger 304 bears against a circular nose 312 on the horizontally extending arm of a stop rocker 305. The rocker 305 is pivotally mounted on the power shaft bracket 186, or more specifically, on one of the arms 188 thereof, by any suitable means, such as pivot stud 306. A toggle spring 307 is attached to a stud 308 on the upper arm of the rocker 305 and a stud 309 attached to the arm 188 of the bracket. The lower arm of the rocker is provided with a shoulder 311 adapted, when the rocker is rocked clockwise from the position shown in FIG. 3, to engage the ear 201 of stop arm 200, shortly before the arm 200 and power shaft 185 return to the rocked position. Stopping of the arm 200 and shaft 185 in this position prevents the complete return of the power slide 170 to its fully extended position, and thus it is ineffective to rock the switch control rocker 165 to the switch-closing position. Thus, whenever air is supplied to the air chamber 301, the mechanism is effective to first select the key of the telephone to be operated and then to stop the device before the switch 163 can be closed again. Since, at this position of the mechanism, shoulder 311 engages ear 201, the parts are locked by the friction between the ear and the shoulder, and the entire device is locked in an inoperative position. Operation of the device is initiated by the depression of a "start" key 24 (FIGS. 1 and 3) which is effective to engage an ear 313 and rock the stop arm 305 to disengage ear 201 on arm 200. Thereupon, the power slide 170 is freed to the force of its spring 174 and the solenoid spring, not shown, to permit the power slide to move to its extended position, whereupon the ear 177 again engages ear 158 on the Micro-Switch actuator 165 and the device is again started on its series of operations.

Preferably, the device of the present invention will include a signal device which will indicate whether the device is operating to call a desired number or is at rest — or what means the same thing, whether or not the pump 210 is in its home position in which outlet 215 registers with channel inlet 261 leading into the first ordinal channel 131, or is in some other position. Such a signal device is preferably visible through a window 25 in the casing 34. Such a signaling device could be a lamp so connected to the power supply as to be lit when the solenoid 161 is being operated or when the pump is out of its home position, or vice versa. It could also be a simple flag painted on the top of the rotatable pump 210, viewable through window 25. While not essential to the operation of the present device, it is convenient to the operator to know whether the device is ready to start a new operation, or is either operating or has been stopped in an intermediate position (which might happen if the device were stopped by the sensing of a "-spot" code and failure of the operator to re-initiate operation by again depressing the start button 24.

It perhaps should be noted that it is assumed that before initiating operation of the present device, the handpiece 23 will be lifted from its cradle 22 as otherwise no telephone circuits could be completed even though the keys, such as 17 or 18, were depressed. It should also be noted that the device of the present invention will operate through the twelve cycles above referred to irrespective of whether or not there is a punched sheet clamped between the two parts of the switching matrix 32. Whenever the start button 24 is operated and the stop mechanism 301 to 313 is released, the pumping mechanism will operate until the stop mechanism is again operated — either in the twelfth cycle or upon the sensing of a stop code. If there is no punched sheet in the device, or if a plurality of holes are punched in any order, the small amount of air moved by the pump is so dissipated that nothing can operate. On the other hand, if there are no holes punched in the sheet 128 (as does occur for the last four spaces, or orders, when calling a seven-digit telephone number), the yield between the power slide 170 and the pump arm 195 permits complete operation of the power slide and consequent rotation of the pump 210 although the passage of air from any supply channel 131 to 141, inclusive, to any of the operating channels 101 to 110, inclusive, is blocked. Thus, if there is no punched paper in the device or an unpunched one is inserted, the present device operates through its twelve steps, or cycles, but the telephone is not operated. In any event, the device is operated to return to its home position in which pump outlet 215 again registers with the first ordinal supply conduit 131.

It should perhaps also be mentioned that no manual stop key is necessary in the present device. If the operator decides he doesn't want to call the number after operation is started, he only has to replace the handpiece 23 in its cradle, and then permit the device to complete its full series of operations.

What is claimed is:

1. An apparatus for sequentially operating the buttons of a pushbutton device according to a preselected, multi-digit number encoded upon a perforated sheet comprising:

a. means operated by fluid pressure for operating the pushbuttons of said device;

b. fluid pressure creating means;

c. a switching means adapted to immovably embrace the said perforated sheet between two parts of said switching means, one part of said switching means having channels corresponding to digit positions of said number and another part of said switching means having channels corresponding to the digit value of said number;

d. means connecting said fluid pressure creating means to the channels of said one part of said switching means in a sequential manner;

e. means for connecting said means for operating the pushbuttons of said device to said another part of said switching means.

2. The apparatus of claim 1 wherein the pushbutton device is a pushbutton telephone.

3. The apparatus of claim 1 comprising also selectively operable means for manually operating the buttons of said device.

4. An apparatus for automatically operating the digit keys of a pushbutton telephone according to a preselected multi-digit number encoded upon a perforated sheet comprising:

a. a switching matrix adapted to receive a sheet, said matrix having one part provided with digit-value air channels corresponding to the digit keys of the telephone, a second part provided with digit position air channels corresponding to the digit positions of a telephone number, and means for moving one of said parts to firmly grip a sheet between them;

b. a power-operated air pump;

c. a plurality of digit position air channels leading from said pump to said second part of said switching matrix;

d. automatic means for selecting one only of said digit position air channels for operation;

e. power means for operating said automatic means to successively connect said air pump to said digit position air channels in sequence;

f. a casing having a means for operating each of the digit keys of a pushbutton telephone; and g. means for connecting the digit value air channels in the said one part of said matrix to the respective means for operating said digit keys.

5. The apparatus of claim 4 wherein said power means for operating said air pump and said automatic means comprises a solenoid.

6. The apparatus of claim 5 comprising also a switching means for controlling the supply of power to said solenoid.

7. The apparatus of claim 4 comprising also an indicating means, and means controlled by said automatic means for operating said indicating means.

8. The apparatus of claim 4 comprising also manually operated means for operating the means for operating said digit keys.

9. The apparatus of claim 4 comprising also stop means for stopping operation of said device and means operated by either the sensing of a stop perforation encoded in said sheet or upon the completion of a predetermined number of digit position operations for operating said stop mechanism.

10. The apparatus of claim 9 comprising also one-way valves interposed between the stop mechanism and the digit value air channels.

11. An apparatus for automatically operating the digit keys of a pushbutton telephone according to a preselected, multi-digit number encoded upon a perforated sheet comprising:

a. a solenoid;

b. a switching matrix adapted to receive a punch card, said matrix having one part provided with air channels corresponding to the buttons of the telephone, a second part provided with digit position air channels corresponding to the digit positions of a telephone number, and means for moving one of said parts to firmly grip a punch card between them;

c. an air pump operated by said solenoid;

d. a plurality of air channels leading from said pump to the said second part of said switching matrix;

e. movable means for selecting one only of said channels for operation;

f. means operated by said solenoid for operating said movable means to connect said air pump to successive ones of said digit position air channels;

g. a casing having a plurality of key operating means corresponding to the digit keys of a pushbutton telephone;

h. means for connecting the first part of said matrix to the corresponding digit key operating means;

i. switching means for controlling the flow of power to said solenoid; and j. means operated by said solenoid for operating the switching means.

12. The apparatus of claim 9 comprising also a signal means and means controlled by said movable means for operating said signal means.

* * * * *